[54] METHOD AND SYSTEM FOR SELECTIVE DISPLAY OF IMAGES FROM A VIDEO BUFFER

[72] Inventor: James Garman Belleson, Pacifica, Calif.

[73] Assignee: International Business Machines Corporation, Armonk, N.Y.

[22] Filed: Nov. 23, 1970

[21] Appl. No.: 91,735

[52] U.S. Cl.......178/6.6 DD, 178/DIG. 6, 340/324 A

[51] Int. Cl..........H04n 5/22, H04n 5/78, H04n 7/08

[58] Field of Search..........178/5.4 ST, DIG. 6, 6.6 A, 178/6.6 DD; 340/324 A

[56] References Cited

UNITED STATES PATENTS 2,603,706 7/1952 Sleeper, Jr. ...........178/5.4 ST

*Primary Examiner*—James W. Moffitt
*Assistant Examiner*—Steven B. Pokotilow
*Attorney*—Hanifin and Jancin and Thomas A. Briody

[57] ABSTRACT

A system for selectively displaying discrete small portions of a large picture on a television monitor, with adjustable controlling means for continuously varying the boundaries of any one of the small portions being displayed. A cyclic disc buffer is provided for the reproduction of video signals. First and second images, each comprising a series of information and vertical retrace lines, are recorded as separate video frames on first and second tracks of a buffer disc so that the first information line of the second image corresponds in time to the first retrace line of the first image. The buffer includes first and second transducers associated respectively with the first and second tracks of the disc. The transducers are connected through a high speed matrix switch to a standard television monitor. The switch forms part of the adjustable controlling means and is adapted to alternatively connect the first and second transducers to the television monitor for directly switching the image output of the television monitor between the last information line of the first image and the first information line of the second image.

12 Claims, 10 Drawing Figures

*INVENTOR*
JAMES G. BELLESON

*BY* Thomas A. Briody

ATTORNEY

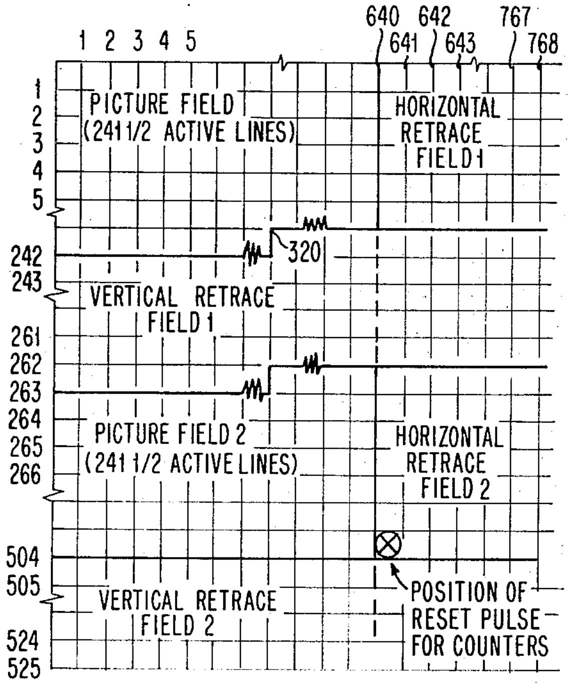
FIG. 3
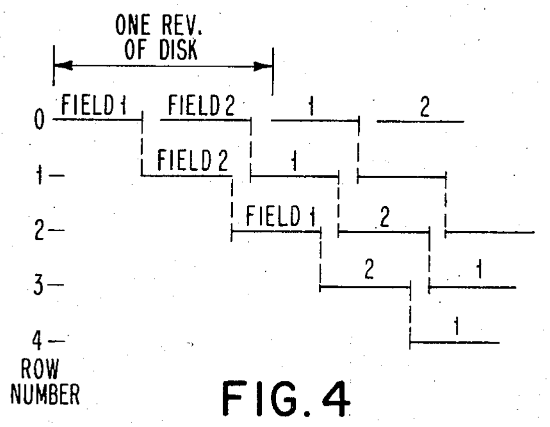
FIG. 4
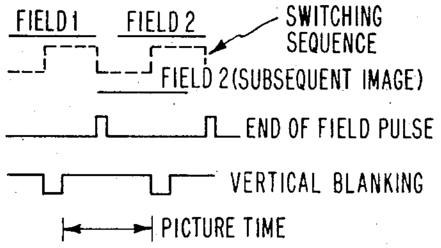
FIG. 5
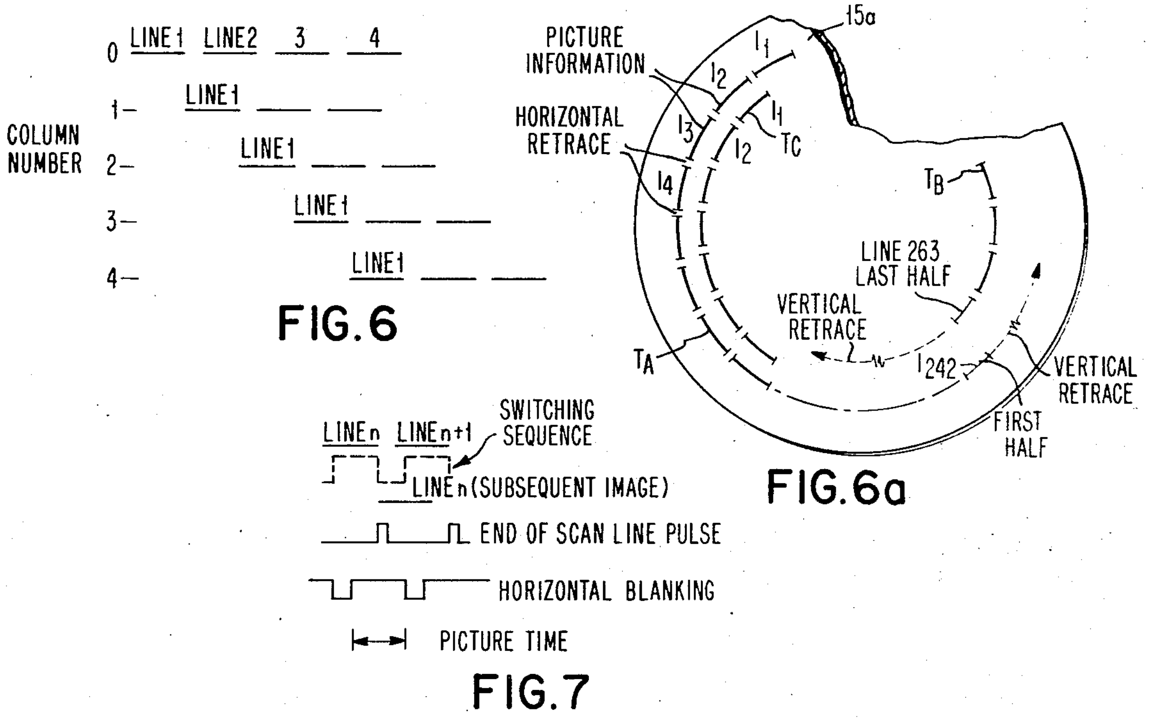
FIG. 6, FIG. 6a
FIG. 7

METHOD AND SYSTEM FOR SELECTIVE DISPLAY OF IMAGES FROM A VIDEO BUFFER

BACKGROUND OF THE INVENTION

1. Field of the Invention

This invention relates to a novel method and system for selectively, sequentially, and continuously displaying a portion of a total picture recorded on a recording medium.

2. Description of the Prior Art

Techniques have been known in the prior art for dividing up a large image into a series of smaller recorded images located on a video buffer for selective replay on a television monitor. In some applications, such a buffer has employed a plurality of tracks, on each of which there is recorded a separate frame of two fields representing an associated smaller image. The prior art has also witnessed the concurrent display of two or more television signals emanating from separate sources, for specific purposes such as studio monitoring, television commercials, or split screen sports viewing.

In the recording and reproduction of television type images on and from cyclic storage media, such as tape and discs, where the larger image has been divided up into a plurality of smaller images located on a video buffer, at times it has been found difficult to perceive the details of the small area located in proximity to its boundaries. Accordingly, it has been found desirable to provide a technique for continuously varying or "-scrolling" the small area on a raster type television display, for the purpose of improving the viewability of details of the small area picture adjacent its boundaries. Such an arrangement affords the operator of the system the capability of selectively, continuously and sequentially varying the small picture area being reproduced from storage, in a manner similar to movement of the viewfinder of a motion picture or television camera, panning a scene which is being recorded.

SUMMARY OF THE INVENTION

An object of this invention is to obtain a novel system for selectively, sequentially and continuously displaying a portion of a total picture on a television output.

Another object of the invention is to provide a system for selectively reproducing a variably positioned image of predetermined area from a series of contiguous picture images recorded on a video buffer.

A further object of the present invention is the provision of an improved system for selectively and continuously reproducing contiguous portions of two adjacent images recorded on a video buffer.

A further object of this invention is to provide a method for selectively reproducing from a repeatable image source, a panoramic type display dependent upon a plurality of contiguous image segments recorded on said source.

In carrying out my invention, in one form thereof, it is applied to a video recording system which includes a rotatably driven disk having a plurality of concentric tracks formed thereon. The large image of a picture is divided up into a plurality of small component image areas each of which is recorded on a separate track of the disk. A plurality of reproducing heads or transducers are associated respectively with the tracks of the disc for reading out the images therefrom. With such an arrangement each of the small recorded images comprises a series of picture information lines and subsequent directional retrace lines. The small component images are recorded on the disc tracks so that the first retrace line of a first image of each contiguously adjacent pair of component images of the picture, corresponds in time to the first picture information line of the second image. The transducers are connected through a high speed matrix switch to a standard television monitor. The switch is adapted to permit the selection of any component image frame in accordance with predetermined row and column addresses. Suitable control means is connected to the high speed matrix switch and to the television monitor, to provide row and column addressing control for the switch and a composite synchronization signal for the monitor. With such a system, a simplified and effective means is achieved for selectively, continuously and sequentially varying the component image reproduced from a repeatable image source, on a standard television monitor.

In carrying out a method aspect of my invention, there is provided a process for selectively reproducing from a repeatable image source, a panoramic type display dependent upon a plurality of contiguous image segments recorded on the source. In one aspect, the process involves the novel step of selectively and cyclically switching from the last picture information line of a first image segment to the first picture information line of the second contiguous image segment, and from a selected reference position of the second image segment back to a selected reference position of the first image segment, for obtaining a continuous sequential display of contiguous portions of the first and second images including a common boundary between them.

BRIEF DESCRIPTION OF DRAWINGS

The foregoing and other objects, features and advantages of this invention will be apparent from the following description of the drawings, in which:

FIG. 3 is a diagrammatic and partially abbreviated illustration of a standard 525 line television frame, showing the relative parameters of its two picture fields, two vertical retrace fields and two horizontal retrace fields;

FIG. 4 shows the recording format and timing relationships of the two fields of each row number for a particular column;

FIG. 5 shows the switching sequence for vertical "-panning" of the reproduced image in accordance with my invention;

FIG. 6 shows the recording format and timing relationships of the frames of each column for a particular horizontal row;

FIG. 6*a* illustrates a recorder disc with exemplary video information bearing tracks positioned thereon in consonance with my invention;

FIG. 7 shows the switching sequence for horizontal "panning" of the reproduced image, as taught by the invention;

DETAILED DESCRIPTION

Figure 1:
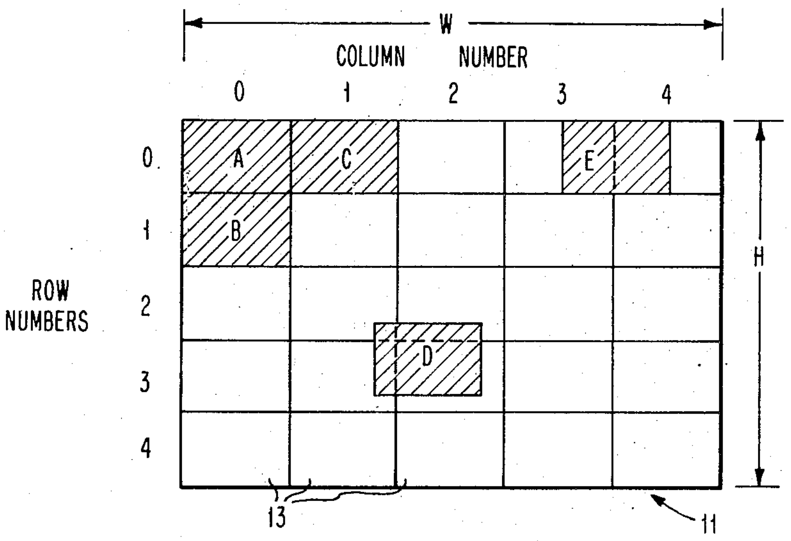
FIG. 1 is an addressable layout of a large rectangular image divided into twenty-five small image areas arranged in five indexed rows and five indexed columns.

The present invention is advantageously applicable for permitting a relatively large picture or image to be viewed on a television display device by allowing the viewer to look at selective small image areas of the total picture. Such a system is often used with worthwhile advantage in image display applications involving medical chest X-rays, enlarged engineering drawings, and military mapping, or the like. As shown in FIG. 1, a large image 11 of width "W" and height "H" is composed of 25 times the area of a small component image 13. There are 25 of these small images 13, and they are organized into Columns 0, 1, 2, 3, 4 and Rows 0, 1, 2, 3, 4.

Figure 2:
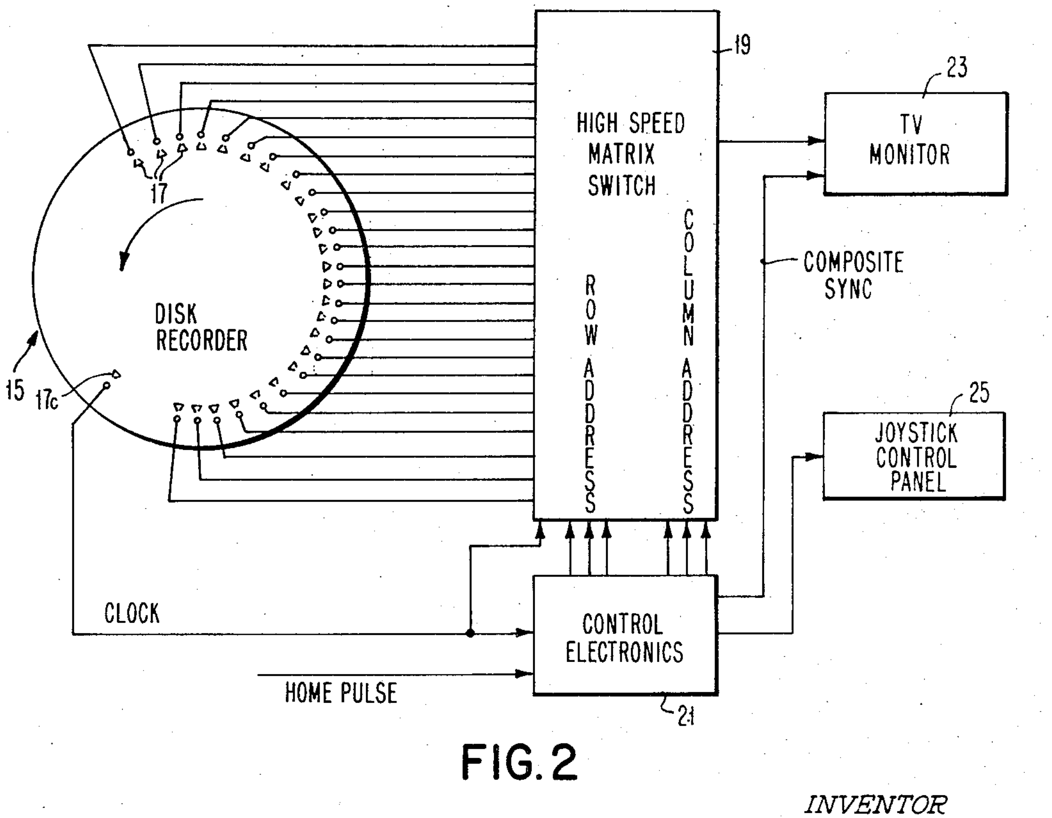
FIG. 2 is a schematic diagram of an exemplary image display system embodying one form of my invention.

To allow the selective reproduction from cyclic storage of the 25 small images 13, in carrying out one form of my invention, there is provided the image display system shown in FIG. 2. As therein illustrated, a disc recorder 15 has a rotatably driven disc upon which there are recorded 25 frames. Each of these frames is written or recorded on a different track of a recording disc of the disc recorder 15 to provide a television display in accordance with the present NTSC standards. These standards require that 15,750 lines be scanned per second. With a vertical scanning rate of 30 times a second, there are 525 lines allocated to each frame and 262.5 lines to each field. Thus, the display involves two fields per frame. Since each field has 262.5 lines, the resulting two fields for each frame are arranged in "interlaced" fashion. That is, the odd number of lines are scanned in the first field and the even number of lines are scanned in the second field. Thus, for an interlace scheme, each field is normally an even number of lines plus a half.

The conventional arrangement of the 525 scanning lines for each frame is shown for purposes of illustration in FIG. 3. Thus, for Field 1 of each frame there are 241.5 horizontal scanning lines of picture information (i.e., from line 0 to 241.5), and 21 horizontal scanning lines allotted for vertical retrace (i.e., from line 241.5 to 262.5). For Field 2 of each frame there are also 241.5 horizontal scanning lines of picture information (i.e. from line 262.5 to line 504), and 21 horizontal scanning lines allotted for vertical retrace (i.e., from line 504 to line 525).

For further referencing purposes and discussion, it will be noted that Fields 1 and 2 of each frame (viewing FIG. 3) include 640 vertical reference lines (i.e., 0–640) for the width of the field of picture information and 128 vertical reference lines (i.e., 641–768) for the horizontal retrace of each field.

In accordance with an important aspect of my invention, the recording format on the disc of the fields for component images in each particular Column (e.g., Column O of FIG. 1) is as shown in FIG. 4, so that the first vertical retrace line of the field of each component image corresponds in time to the first information or picture line of a field of the next component image in the Column, etc. For example, viewing FIG. 4 and assuming that it represents the timing sequence of the Fields for the rows of Column 0 (FIG. 1), it will be noted that the end of the picture portion of Field 1 of Frame A(0,0), which constitutes the beginning of the vertical retrace portion of Field 1 of Frame A, corresponds in time to the first picture line of Field 2 of Frame B (0,1).

By the same token, the recording format on the disc of the horizontal scan lines for the component images in a particular Row (e.g., Row 0) is as shown in FIG. 6, so that the first horizontal retrace point (or position) of each line corresponds in time to the first information reference point (or position) of the same numbered line for each successive row. For example, viewing FIG. 6, and assuming that it represents the timing sequence of the referenced scanning lines for the columns of Row 1 (FIG. 1), it will be noted that the end of the horizontal scanning line No. 1 of Frame A (0,0), which constitutes the beginning of horizontal retrace to the next scanning line, corresponds in time to the beginning of horizontal scanning line No. 1 of Frame C (0,1).

It will thus be seen that the 25 small component images 13 are recorded on the disc of the recorder 15 so that each of the images or frames is recorded in a separate track, with the first vertical retrace line of each image corresponding in time to the first picture line of each subsequent successive image in a vertically downward direction (viewing FIG. 1), and with the first horizontal retrace line of each image corresponding in time to the first picture line of each subsequent successive image in a horizontally rightward direction (viewing FIG. 1). The purpose of this arrangement of the component images on the recording disc shall become apparent hereinafter.

As one example of the arrangement of the component images on a recorded disc 15*a*, attention is directed to FIG. 6*a*. Therein shown, on the disc 15*a* are tracks $T_A$, $T_B$ and $T_C$. Track $T_A$ represents one form of recording for Frame A of FIG. 1, while Tracks $T_B$ and $T_C$ represent, in like fashion, the Frames B and C thereof, respectively. It will be noted that the lines $1_1$, $1_2$, $1_3$, etc. for track $T_A$ are spaced apart by a horizontal retrace period, and they terminate at the line 241.5, which is followed by a vertical retrace period. After this, on track $T_A$, there is recorded a series of lines from 262.5 to 504 (not shown) with a horizontal retrace period located between the end of each line and the beginning of next. After line 504 on track $T_A$ there is also recorded a second vertical retrace period, located prior to line 1.

The recording of Frame C, which is contained on track $T_C$, is staggered with respect to the line and retrace arrangement of Frame A on track $T_A$, so that the beginning of line $1_1$ of track $T_C$ coincides in time with the beginning of the horizontal retrace period between line $1_1$ and $1_2$ of track $T_A$.

The recording of Frame B, which is contained on track $T_B$ of disc 15*a*, is staggered with respect to the end of the video information bearing portion (i.e., line 241.5 of Frame A) so that the beginning of the second frame (i.e., line 262.5) of component image B coincides in time with the beginning of the vertical retrace period for image A.

As further illustrated in FIG. 2, the disc recorder 15 includes 25 separate recording heads 17. Each of the recording heads 17 is positioned adjacent to one of the 25 tracks for reading one of the small component images. The recording heads 17 are each connected to a high speed matrix switch 19, which is operably coupled to a control electronics unit 21, and to a standard television monitor 23 controlled thereby. More specifically, in accordance with a preferred embodiment of my invention, a control panel 25 which involves a joystick, is connected to the control electronics unit 21 for readily selecting from recorder 15 the image to be viewed on monitor 23. The high speed matrix switch 19 includes row and column addresses for each of the 25 small component images and is operated by suitable clocked logic that permits "instantaneous" switching between frames (or tracks). Thus, a logic unit located in the control electronics unit 21, changes the row and column addresses at the correct time, in accordance with the operation of control panel 25. In the illustrative embodiment, panel 25 incorporates a joystick for enabling the operator to "pan" a small component image derivative from the large image, and display it on the screen of monitor 23. Clocking signals are derived for the control electronics unit 21 and switch 19, via clocking head 17*c*. It will also be noted that a home pulse source is provided for the control electronics unit 21.

For a further explanation of the technique of swiching achieved by the matrixing switch 19, attention is directed to FIGS. 4, 5, 6, and 7. The switching required between two frames in a particular column is similar in concept to the switching required between two frames in a particular row. As an example, let us suppose that the operator should want to "scroll" or "-pan" between frames (0,3) and (0,4) to obtain image E. Frame (0,4) has been recorded on the disk in a position so that its first picture element is displaced by one picture time after picture element 640 of frame (0,3). By switching from frame (0,3) to (0,4) at the appropriate time, the operator can obtain the following picture element sequence:

$$\underbrace{\ldots .\ 639,\ 640,}_{\text{frame } 0,3}\ \underbrace{1,\ 2,\ 3\ \ldots .}_{\text{frame } 0,4}$$

If the operator should select the last picture element in the rightward direction of the viewed component image, as picture element 29 of frame (0,4), then each visible line of the image raster would consist of the following sequence:

$$\underbrace{30\ \ldots .\ 639,\ 640,}_{\text{frame } 0,3}\ \underbrace{1,\ 2,\ 3\ \ldots\ 29}_{\text{frame } 0,4}$$

However, it should also be understood that horizontal blanking or retrace would commence immediately after picture element 29 is displayed.

Thus, viewing FIGS. 1, 2, 3, the operator switches from the magnetic track corresponding to frame (0,3) to the track corresponding to frame (0,4), between picture elements 640 and 1, respectively. He then immediately and automatically switches back to frame (0,3) after picture element 29 of frame (0,4) is displayed. Horizontal blanking is thus initiated automatically after the completion of picture element 29 of frame (0,4) and terminated immediately before picture element 30 of frame (0,3) is available for display. Such a switching sequence is repeated for each scan line, as shown in FIG. 7.

For switching from picture element 640 of one frame to picture element 1 of the next frame, in the same horizontal row in addition to the staggered frame arrangement of the images, (as shown in FIG. 6), there is provided the switching sequence shown in FIG. 7 for matrix switch 19 to achieve horizontal "panning" or "-scrolling" of the images. Also shown, are the timing relationships of the same number scanning lines of one image and its subsequent image (e.g. line $n$, $n+1$, etc.), and the end of the scan line pulses, which is used to reset the logic of the control electronics unit 21 as shall be further described hereinafter. In addition, FIG. 7 shows the horizontal blanking pulses, which determine the picture time.

As previously mentioned herein, the technique for switching between frames in a particular column (i.e., vertical "panning" or "scrolling") is very similar to the procedure for switching between frames in a row. The only significant difference is caused by the interlaced scanning technique hereinbefore described. As a result of this, for elimination of the usual vertical retrace at the end of a conventional recorded field, one must switch from a midpoint in the last picture line of field 1 in the top or upper frame (e.g., frame A) to a midpoint in the first picture line of field 2 in the bottom or lower contiguous frame. (See FIG. 6*a*) When switching from the last line of field 2 of the top picture to the first line of field 1 of the bottom picture, the switching takes place at the end of the horizontal scan line (See also FIGS. 3 and 4).

As previously set forth, the alignment of the fields for several frames in a particular column for vertical "-panning" is shown in FIG. 4. In consonance with this approach, in FIG. 5, the switching sequence is shown for matrix switch 19 to achieve vertical "panning" or "-scrolling" of the images. Also shown, are the timing relationships of the field of one image and the field of its subsequent image (e.g., field 1 of image 0,1 to field 2 of image 1,0), and the end of the field pulses which is used for resetting the logic of the control electronics unit. In addition, FIG. 5 shows the vertical blanking pulses, which determine the picture time for a vertically "panned" image.

It will be understood by those skilled in the art, that it is within the tenor of my invention to combine the switching processes set forth in FIGS. 5 and 7, to obtain diagonal "panning" or "scrolling." Such an arrangement could readily produce an image such as image D of FIG. 1.

Figures 8, 8A:
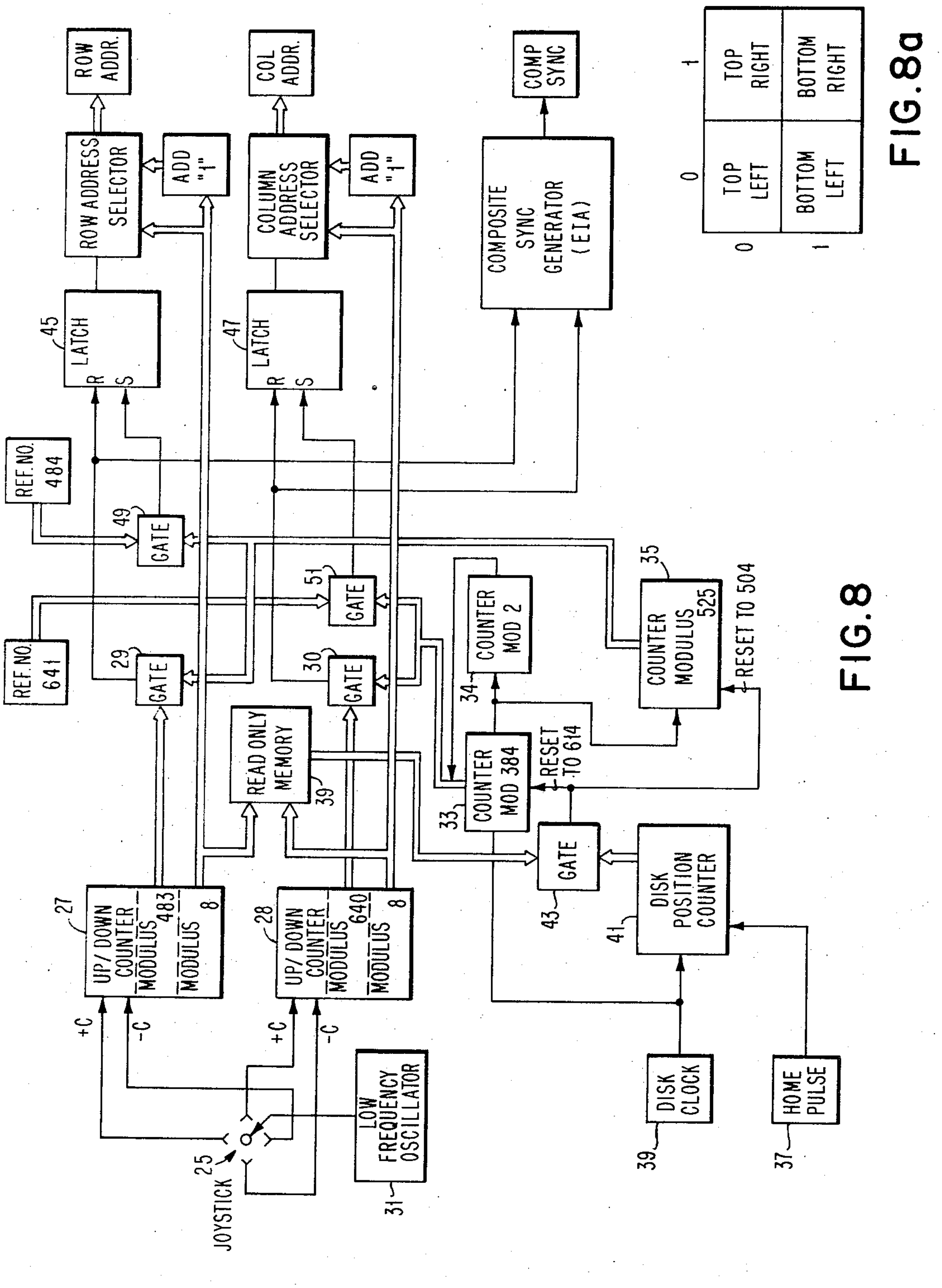
FIG. 8 represents a schematic of one typical control logic circuit which may be used in conjunction with my invention.
FIG. 8*a* represents an addressable large image used in explaining the schematic circuit of FIG. 8.

For an understanding of one typical means for selectively controlling the "panning" or image selection for my invention, attention is directed to the control logic circuit of FIG. 8. Before discussing this circuit, let us first suppose that the total large image of FIG. 1 is divided into four rectangularly configured frames of equivalent area, one of these being the "top left" frame, one being the "top right" frame, and the other two being the "bottom left" and "bottom right" frames. (See FIG. 8*a*.) With such an arrangement, for the purposes of explanation, the top left frame (0,0) may be considered the base frame. If the logic system of FIG. 8 has been reset, the displayed image will be the base frame.

A joystick 25 is connected to a pair of up/down counters 27, 28. The up/down counter 27 includes a modulus 483 portion that has its output connected to a coincidence gate 29, and it feeds to gate 29 an output value equivalent to the delay in half scan lines between the last lines of every other field (i.e., the total number of picture information lines in two fields) associated with the top image(s), and vertical blanking. Counter 27 also includes a modulus 8 portion, which outputs to an incrementing "Add 1" unit coupled to a row address selector, as well as to a read only memory 39, for furnishing thereto the row number of the top image.

The up/down counter 28 includes a modulus 640 portion that has its output connected to a coincidence gate 30, and it feeds an output value to gate 30 equivalent to the delay in picture elements between the last element of each line associated with the right image(s) and horizontal blanking. Counter 28 also includes a modulus 8 portion, which outputs to an incrementing "Add 1" coupled to a column address selector, and also to the read only memory 39, for providing thereto the column number of the right image(s).

The output of read-only memory 39 is fed into a coincidence gate 43, which is coupled to a disk position counter 41 that receives signals from disk clock 39 and home pulse 37. The output of coincidence gate 43 is connected to a counter 33, which has a modulus 384. This counter 33 is also connected to and receives an input from the disc clock 39. Counter 33 is also coupled, as shown in FIG. 8, to Counter 34 (of modulus 2) with the juncture between counters 33, 34 being fed to Counter 35 (of modulus 525). For resetting Counter 33 to 641, and for resetting counter 35 to 504, the outputs of gate 43 is connected to both of these counters.

The output of Counter 33 is branched into coincidence gates 30, 51, the latter of which is provided with a 641 reference number. The output of counter 35 is branched to coincidence gates 29, 41, the latter of which has 484 as a reference number.

The outputs of coincidence gates 29 and 49 are fed to flip flop latch 45, which in turn is outputted to a row address selector portion of matrixing switch 19.

The outputs of coincidence gates 30, 51 are fed to a flip flop latch 47, which has its output coupled to a column address selector portion of the matrixing switch 19.

To obtain the required composite sync signals for television monitor 23, an EIA composite sync generator 51 is connected respectively to the leads between gate 29 and latch 45, and between gate 30 and latch 47.

In operation of the control circuit of FIG. 8, when the logic is initialized, the base frame will be frame (0,0). The joystick 25 is driven by a local oscillator 31, and can be used to increment the counters 27, 28 so that a portion of the other adjacent frames can be viewed. When the joystick 25 is moved far enough to cause the original base frame to move out of the displayed image, the counters 27 and/or 28 automatically increment. This causes another frame to be selected as the base frame. For this example, the next base frame could be frame (0,1), (1,0), or (1,1), depending upon the direction of "panning" or "scroll."

The end of each of the scan line pulses (FIG. 7) and the end of each of the field pulses (FIG. 5) coincides with the end of the picture field or visible portion of line 504 (FIG. 3). This point of time on the base frame is used for resetting the logic. It should be understood that as the base frame changes, this point of time for resetting the logic also is changed. Each base frame has its own reset pulse time, which is used to reset counters 33 and 35.

The base frame reset pulse is positioned by using home pulse 37, which occurs once each revolution of the disc; in conjunction with the read-only memory 39, that produces a count corresponding to the reset pulse time for the particular base frame; disk position counter 41; and coincidence gate 43. The output of the coincidence gate 43 is the reset pulse. This reset pulse resets counters 33 and 35 so that their count corresponds to the picture element count of the base frame. These reset pulses also cause the pair of latches 45 and 47 to set by means of their associated coincidence gates 49, 51 which connect them respectively to the counters 35 and 33. The outputs of the coincidence gates 49, 51 are the "end of scan line pulse" and "end of field pulse" shown in FIGS. 7 and 5, respectively. The outputs of the other pair of coincidence gates 29 and 30 cause the latches 45 and 47 to be reset when the count of the modulus 483 portion of counter 27 and the modulus 640 portion of counter 28 correspond to the count of counters 35 and 33, respectively. These two output pulses trigger vertical and horizontal blanking, as shown in FIGS. 5 and 7.

Latches 45 and 47, when they are in their reset positions, cause the row and column addresses to equal the address of the base frame. However, when they are set, the output addresses then equal the address of the base frame plus one. This causes switching from one frame (e.g., $n,m$) to another frame (e.g., $n + 1$, m), to still another frame (e.g., $n$, $m + 1$), or to yet another frame (e.g., $n+1, m+1$).

Counter 35 is incremented at twice the horizontal line rate so that switching between field 1 of the base image and field 2 of the next subsequent image in the vertical direction (i.e., below) can take place at the middle of the horizontal scan line.

By using such a logic circuit as that shown schematically in FIG. 8, the desired switching occurs for "-panning" or "scrolling" the small component image horizontally, vertically or diagonally on the television monitor 23.

It will now, therefore, be seen that I have provided a new and improved technique for selectively, continuously and sequentially displaying a small recorded image area of a larger area, on a standard television monitor. This system and method may be used inexpensively and effectively to clearly display portions of small images which might otherwise fall near the boundaries of the raster.

While in accordance with the Patent Statutes, I have described what at present is considered to be a preferred aspect of this invention, it will be obvious to those skilled in the art that various changes or modifications may be made therein without departing from the present invention.

What I claim is:

1. In an image display system that includes a device for selectively displaying portions of a total picture, means for reproducing first and second images which represent contiguous discrete portions of a total picture, each of said first and second images comprising a series of information lines followed by at least one directional retrace line, means for positioning said first and second images in said reproducing means so that the first information line of said second image corresponds in time to the first retrace line of said first image, means connected to the reproducing means for display of said first and second images on a cathode ray tube output, and means connected between the reproducing means and the display means for selectively and alternately switching from the last information line of said first image to the first information line of said second image, and from a selected information line of said second image back to a selected information line of said first image, thereby to permit the continuous sequential and panoramic display of contiguous portions of said total picture.

2. In an image display system that includes a device for selectively displaying portions of a total picture;

means for cyclically reproducing first and second images representing contiguous first and second portions of a total picture, in a video buffer;

said second picture portion being located vertically below said first picture portion and having a common horizontal boundary therewith;

each of said first and second images comprising a series of picture information lines followed by a series of vertical retrace lines, means for positioning said first and second images in said cyclic reproducing means so that the first picture information line of the second image corresponds in time to the first vertical retrace line of said first image, means connected to the cyclic reproducing means for display of said first and second images on a cathode ray tube output, and selective switching means connected between the reproducing means and the display means for selectively and alternately switching from the last picture information line of the said first image to the first picture information line of said second image and from a selected picture information line of said second image back to a selected picture information line of said first image, thereby to permit the continuous sequential display in a vertical direction of contiguous portions of said first and second images including the horizontal boundary therebetween.

3. The image display system of claim 2, wherein the reproducing means is a video disc recorder having a rotatable recording disc with first and second tracks formed thereon, said first track having the picture information and vertical retrace lines of said first image recorded thereon, said second track having the picture information and vertical retrace lines of said second image recorded thereon, and first and second transducers associated respectively with said first and second tracks and connected to the selective switching means for alternatively picking up signals representative of said first and second images for transmission to the display means.

4. In an image display system that includes a device for selectively displaying portions of a total picture;

means for cyclically reproducing first and second images representing contiguous first and second portions of a total picture, in a video buffer;

said second picture portion being located horizontally to the right of said first picture portion and having a common vertical boundary therewith;

each of said first and second images comprising a series of picture information lines followed by a series of horizontal retrace lines;

means for positioning said first and second images in said cyclic reproducing means so that the beginning of the first picture information line of the second image corresponds in time with the first horizontal retrace line of the first picture information line of said first image;

means connected to the cyclic reproducing means for displaying said first and second images on a cathode ray tube; and switching means connected between the reproducing means and the display means for selectively and alternately switching from the end of the first picture information line of said first image to the beginning of the first picture information line of said second image and from a selected horizontal position of the information lines of said second image back to a selected horizontal position of the information lines of said first image;

thereby to permit continuous sequential display in a horizontal direction of contiguous portions of said first and second images including the vertical boundary therebetween.

5. The image display system of claim 4, wherein the reproducing means is a video disc recorder having a rotatable recording disc with first and second tracks formed thereon, said first track having the picture information and horizontal retrace lines of said first image recorded thereon, said second track having the picture information and horizontal retrace lines of said second image recorded thereon, and first and second transducers associated respectively with said first and second tracks and connected to the selective switching means for alternatively picking up signals representative of said first and second images for transmission to the display means.

6. In an image display system for selectively displaying a plurality of portions of a total picture on a standard television monitor;

a recording device including a rotatable recording medium;

first, second and third tracks formed on said recording medium;

first, second and third picture portions of the total picture recorded respectively on said first, second and third tracks;

said second picture being located contiguously to the right of said first picture, forming part of said total picture, and having a common vertical boundary therewith;

said third picture being located contiguously below said first picture, forming part of said total picture, and having a common horizontal boundary therewith;

each of said tracks extending continuously in a closed path of said recording medium and including a series of working picture lines, a vertical retrace interval and a plurality of horizontal retrace intervals;

the picture lines and horizontal retrace intervals of said first track being located relative to the picture lines, and horizontal retrace intervals of said second track so that the beginning of the horizontal retrace interval at the end of the first information line of said first picture is adjacent in time to the beginning of the first information line of said second picture;

the picture lines and vertical retrace interval of said first track being located relative to the picture lines and vertical retrace interval of said third track so that the last information line at the bottom of the first picture is adjacent in time with the first information line at the top of said third picture;

said recorder including first, second an third transducers associated respectively with said first, second and third tracks for reading the picture portions therefrom, and selective high speed switching means connected between said transducers and a standard television monitor for sequentially and selectively switching between said transducers to obtain a variable output image on said monitor which may include portions of each of said first, second and third pictures including the boundaries between said second and third picture portions and said first picture portion.

7. The image display system of claim 6, wherein the switching means is a high speed matrixing switch.

8. The image display system of claim 7, wherein the high speed matrixing switch is controlled by a row and column address logic unit, which unit is connected to and operated by a joystick.

9. A method for selectively reproducing from a repeatable image storage source and displaying on an output device connected thereto, a plurality of segments of a total picture recorded on said source, said method comprising:

reproducing from a first track of said storage source a first image segment having a series of video information lines and at least one vertical retrace line, reproducing from a second track of said storage source a second image segment having a horizontally extensive common boundary with said first image, said second image segment also having a series of video information lines and at least one vertical retrace line, and selectively and cyclically switching from the last video information line of the first image segment to the first information line of said second image segment, and from a selected video information line of said second image segment back to a selected information line of said first image segment, thereby to permit the continuous sequential and panoramic display of contiguous portions of said first and second image segments including said common boundary.

10. The method described in claim 9 wherein the repeatable image storage device is a magnetic record.

11. A method for selectively reproducing from a repeatable image storage source and displaying on an output source connected thereto, a plurality of segments of a total picture recorded individually upon said source, said method comprising:

reproducing from a first track of said storage source a first image segment represented on said track by a series of video information lines and a series of intermittent horizontal retrace intervals, reproducing from a second track of said storage source a second image segment having a vertically extensive common boundary with said first image, said second image segment being represented on said second track by a series of video information lines and a series of intermittent horizontal retrace intervals, and selectively and cyclically switching from the end of the first picture information line of said first image segment to the beginning of the first picture information line of said second image segment and from a selected horizontal reference position of the information lines of said second image segment back to a selected horizontal reference position of the information lines of said first image segment, thereby to permit the continuous and panoramic sequential display of contiguous portions of said first and second image segments including said common boundary.

12. The method described in claim 11 wherein the repeatable image storage source is a magnetic record.

* * * * *